(12) United States Patent
Sumida

(10) Patent No.: US 8,072,558 B2
(45) Date of Patent: Dec. 6, 2011

(54) LIGHTING DEVICE FOR DISPLAY DEVICE AND DISPLAY DEVICE

(75) Inventor: Akira Sumida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 208 days.

(21) Appl. No.: 12/521,186

(22) PCT Filed: Aug. 3, 2007

(86) PCT No.: PCT/JP2007/065251
§ 371 (c)(1),
(2), (4) Date: Jun. 25, 2009

(87) PCT Pub. No.: WO2008/078428
PCT Pub. Date: Jul. 3, 2008

(65) Prior Publication Data
US 2010/0014021 A1     Jan. 21, 2010

(30) Foreign Application Priority Data

Dec. 26, 2006   (JP) ................................. 2006-350132

(51) Int. Cl.
*G02F 1/1335* (2006.01)
(52) U.S. Cl. ................ 349/61; 349/56; 349/62; 349/67; 349/68
(58) Field of Classification Search .................... 349/56, 349/61, 62, 67, 68
See application file for complete search history.

(56) References Cited

U.S. PATENT DOCUMENTS

| | | | |
|---|---|---|---|
| 6,822,705 B2 * | 11/2004 | Shimoda et al. | 349/62 |
| 7,077,542 B2 | 7/2006 | Lee et al. | |
| 7,771,104 B2 * | 8/2010 | Iwasaki | 362/628 |
| 7,784,958 B2 * | 8/2010 | Nakagome | 362/97.2 |
| 2006/0170838 A1 | 8/2006 | Choi et al. | |
| 2009/0268433 A1 * | 10/2009 | Kusano | 362/97.1 |
| 2010/0014020 A1 * | 1/2010 | Teragawa | 349/61 |

FOREIGN PATENT DOCUMENTS

| | | |
|---|---|---|
| JP | 08-179318 A | 7/1996 |
| JP | 2004-102119 | 4/2004 |
| JP | 2005-292575 | 10/2005 |
| JP | 2005-347062 | 12/2005 |
| JP | 2006-259750 | 9/2006 |
| JP | 2006-260931 | 9/2006 |
| JP | 2006-339136 | 12/2006 |

OTHER PUBLICATIONS

International Search Report for PCT/JP2007/065251, mailed Sep. 11, 2007.

* cited by examiner

*Primary Examiner* — Jennifer Doan
(74) *Attorney, Agent, or Firm* — Nixon & Vanderhye P.C.

(57) ABSTRACT

A lighting device for a display device includes a plurality of linear light sources 17 arranged parallel to one another, and a light reflecting plate 14 arranged on the side of the linear light sources 17 that corresponds to the opposite side of the light emitting side. Angled reflective portions 40 each having two inclined surfaces 41, 42 are provided on the light reflecting plate 14, so as to be each positioned between adjacent linear light sources 17. The inclination angle $\theta 1$ of the first inclined surface 41a of a first angled reflective portion 40a is set to be larger than the inclination angle $\theta 2$ of the first inclined surface 41b of a second angled reflective portion 40b that is positioned closer to the center of the array of the linear light sources 17 than the first angled reflective portion 40a.

12 Claims, 5 Drawing Sheets

LIGHTING DEVICE FOR DISPLAY DEVICE AND DISPLAY DEVICE

This application is the U.S. national phase of International Application No. PCT/JP2007/065251, filed 3 Aug. 2007, which designated the U.S. and claims priority to Japanese Application No. 2006-350132 filed 26 Dec. 2006, the entire contents of each of which are hereby incorporated by reference.

TECHNICAL FIELD

The present invention relates to a lighting device for a display device and a display device using the same.

BACKGROUND ART

In a display device having non-luminous optical elements as typified by a liquid crystal display device, a backlight device is provided on the backside of a display panel such as a liquid crystal panel, so as to illuminate the display panel (as shown in Patent Document 1, for example).
Patent Document 1: JP-A-2005-347062

Problem to be Solved by the Invention

Patent Document 1 discloses a technique for enhancing the central brightness of a display screen while compensating brightness reduction in the peripheral areas of the display screen in order to maintain brightness uniformity of the display screen. Specifically, a plurality of fluorescent lamps are arranged so that the intervals therebetween are narrower at the central area corresponding to the central area of the display screen of a display panel, than at the peripheral areas corresponding to the peripheral areas of the display screen. Further, the distances between a diffuser plate and the plurality of fluorescent lamps are set to be larger at the central area than at the peripheral areas, in order to achieve brightness uniformity of the display screen as well as enhancement of the central brightness of the display screen.

As additional means for compensating the unevenness of brightness particularly at the peripheral areas of the display screen, reflectors having angle sections are provided integrally on the bottom surface of a reflecting plate, or specifically, in the areas prone to the unevenness of brightness, and are arranged along the longitudinal direction of the fluorescent lamps.

However, the plurality of reflectors have the same angled shape as one another so that lights reflected by the reflectors are equivalently oriented, and therefore the reflected lights may fail to achieve sufficient enhancement of the central brightness.

The present invention was made in view of the foregoing circumstances, and an object thereof is to provide a lighting device for a display device, capable of effectively concentrating lights from light sources at the center so as to be able to enhance the central brightness of a display screen. A further object of the present invention is to provide a display device capable of providing high-quality images using the above lighting device for the display device.

DISCLOSURE OF THE INVENTION

Means for Solving the Problem

In order to solve the above problem, the present invention provides a lighting device for a display device, which includes a plurality of tubular light sources arranged parallel to one another, and further includes a light reflecting plate arranged on the side of the tubular light sources that corresponds to the opposite side of the light emitting side. Angled reflective portions each having two inclined surfaces are provided on the light reflecting plate, so as to be each positioned between adjacent tubular light sources of the above tubular light sources. As for the first inclined surface of the two inclined surfaces of the angled reflective portion that faces the inner side of the array of the tubular light sources, the inclination angle of the first inclined surface of a first angled reflective portion is set to be larger than the inclination angle of the first inclined surface of a second angled reflective portion that is positioned closer to the inner side of the array of the tubular light sources than the first angled reflective portion.

In the lighting device for a display device having the above construction, the first angled reflective portion on the outer side of the array of the tubular light sources includes the first inclined surface arranged at a larger inclination angle. Thereby, the lights can be further concentrated at the center. When angled reflective portions for suppressing unevenness of brightness are arranged between tubular light sources so as to have inclined surfaces (or first inclined surfaces) arranged at the same inclination angle, the lights are equivalently oriented when being reflected by the angled reflective portions, and accordingly fail to be concentrated at the center. In contrast, according to the present invention, the angled reflective portions are constructed so that the angled reflective portion on the outer side includes the first inclined surface arranged at a larger inclination angle. Thereby, the reflected lights can be further concentrated at the center, and consequently a display device using the present lighting device for the display device can have enhanced central brightness of display. Note that the inclination angle means the angle of the first inclined surface with respect to the fundamental plane of the angled reflective portion, in the present invention.

BEST MODE FOR CARRYING OUT THE INVENTION

An embodiment of the present invention will be hereinafter explained with reference to the drawings.

Figure 1:
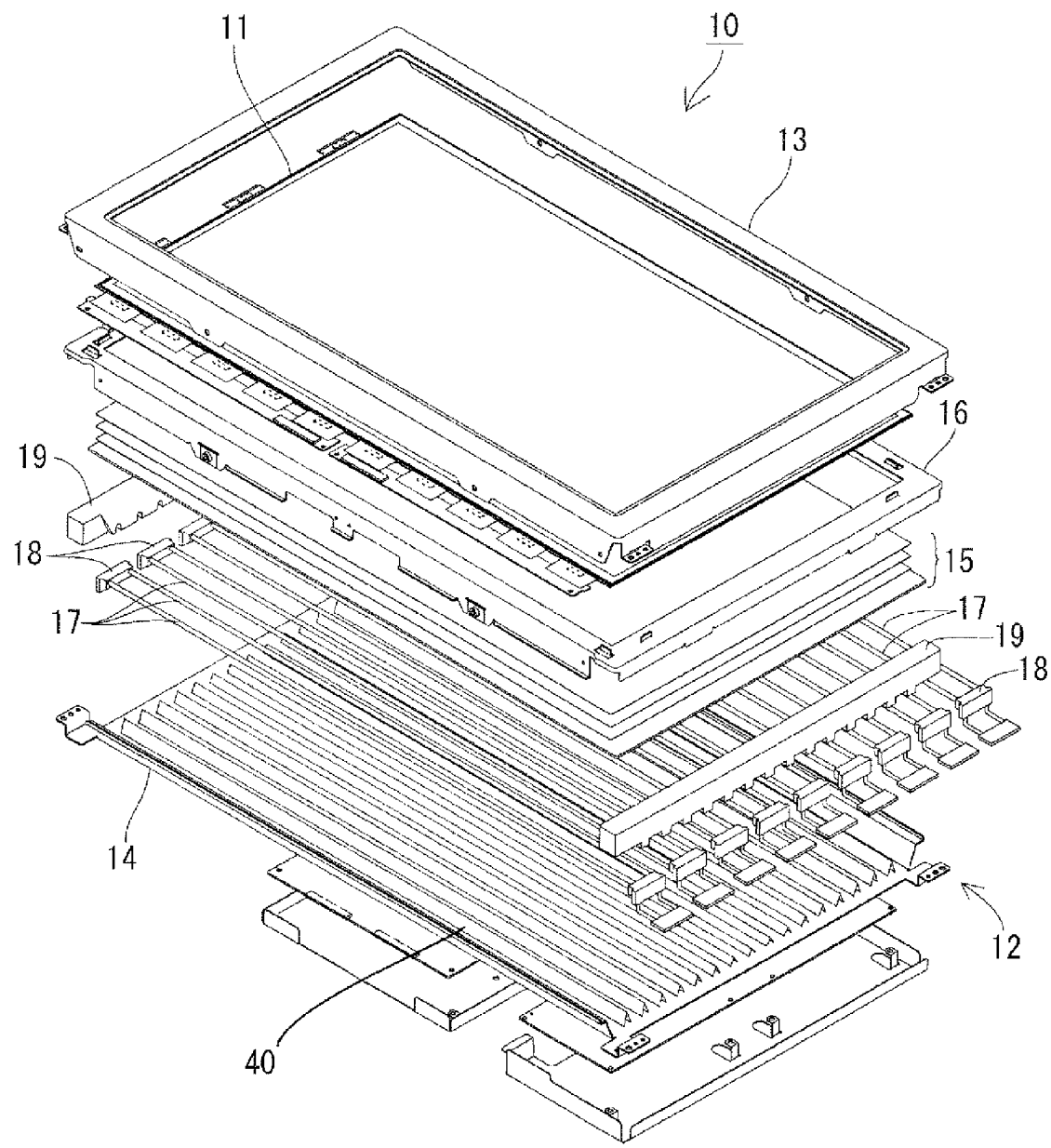
FIG. 1 is an exploded perspective view showing the general construction of a liquid crystal display device according to an embodiment of the present invention.
Figure 2:
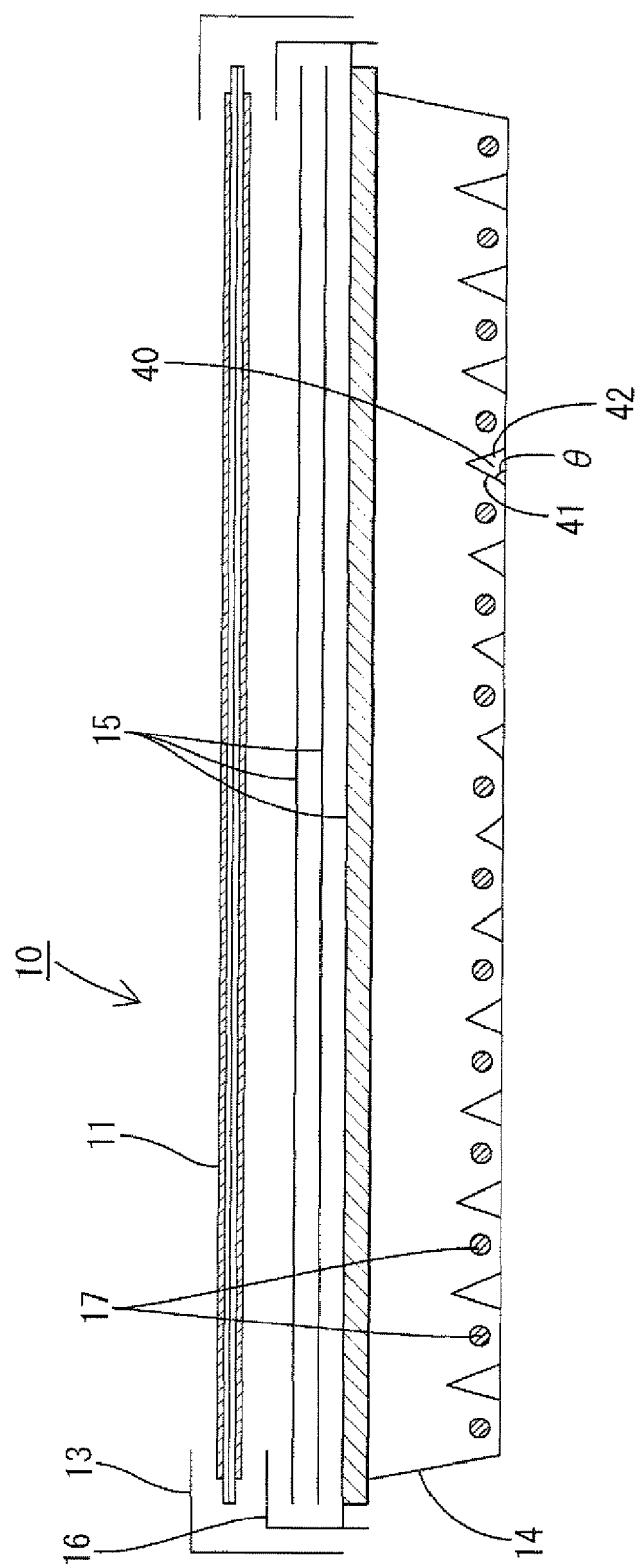
FIG. 2 is a sectional view of the liquid crystal display device shown in FIG. 1.
Figure 3:
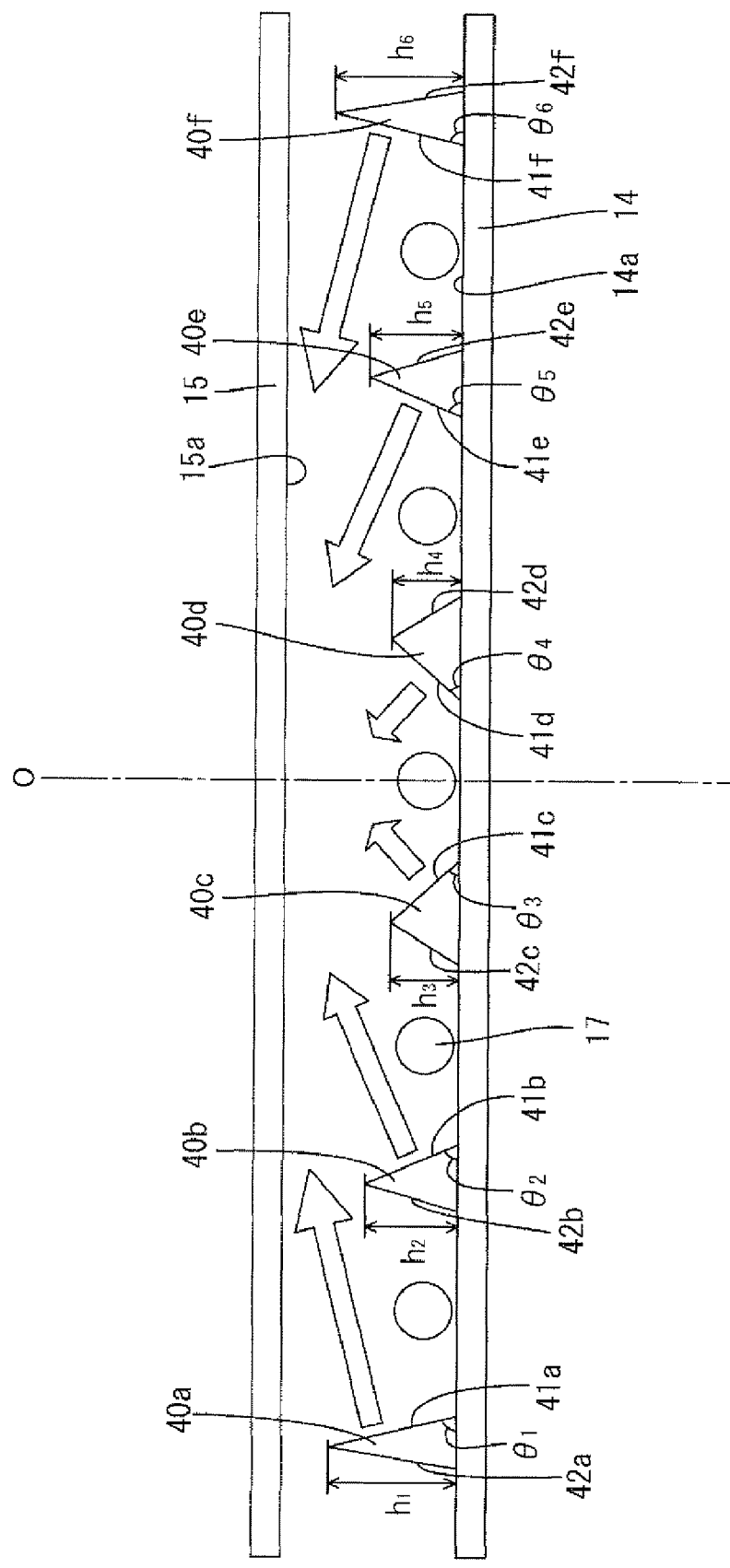
FIG. 3 is an explanatory diagram showing the construction and operational effects of a backlight device.
Figure 4:
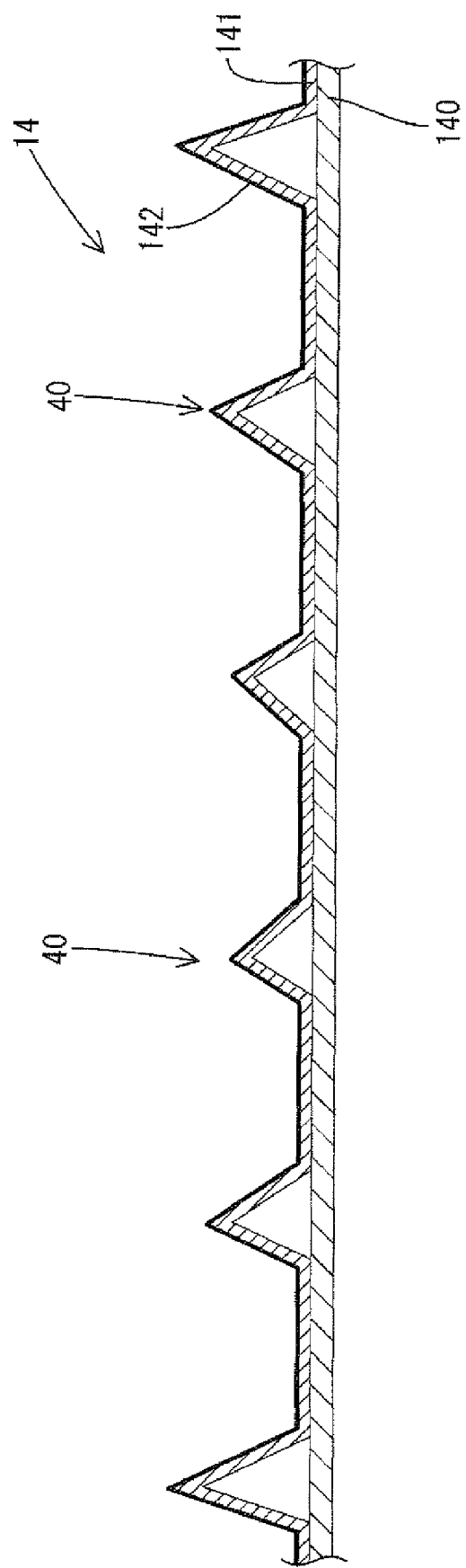
FIG. 4 is a sectional view schematically showing the construction of a base (or light reflecting plate) of the backlight device.
Figure 5:
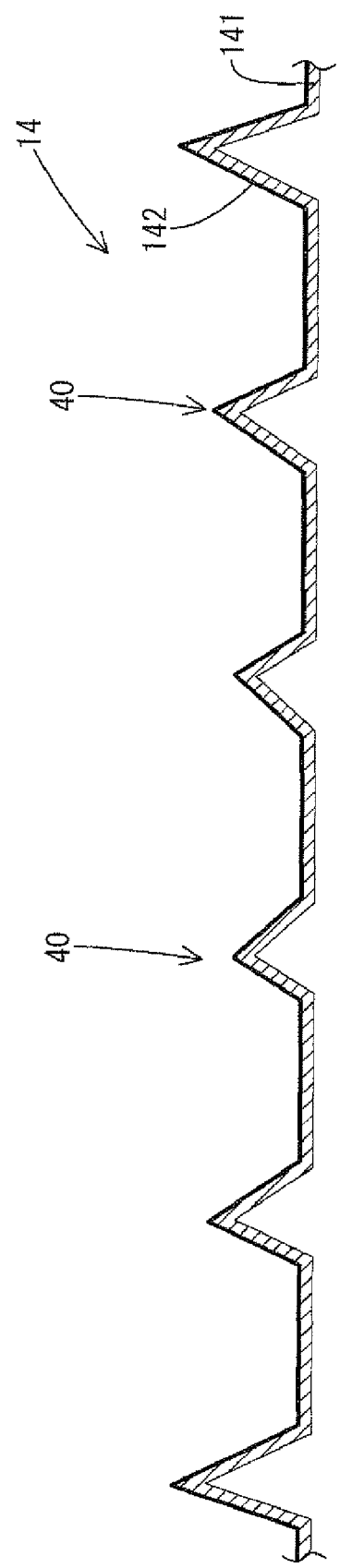
FIG. 5 is a sectional view schematically showing a modification of the base (or light reflecting plate) of the backlight device.

FIG. 1 is an exploded perspective view showing the general construction of a liquid crystal display device according to the embodiment of the present invention. FIG. 2 is a sectional view also showing the general construction of the liquid crystal display device. FIG. 3 is an explanatory diagram showing the construction and operational effects of a backlight device included in the liquid crystal display device of the present embodiment. FIG. 4 is a sectional view schematically showing the construction of abase (or light reflecting plate) of the backlight device. FIG. 5 is a sectional view schematically showing a modification of the base (or light reflecting plate) of the backlight device.

The general construction of the liquid crystal display device (display device) 10 will be explained first. Referring to FIGS. 1 and 2, the liquid crystal display device 10 includes a liquid crystal panel 11 having a rectangular shape, and a backlight device 12 as an external light source, which are integrally held by a bezel 13 and the like. The liquid crystal panel 11 includes a pair of glass substrates, which are attached to each other so as to face each other while a gap of a predetermined size is kept therebetween. Liquid crystal is disposed between the glass substrates. Switching elements (e.g., TFTs) connected to a source wiring line and a gate wiring line running at right angles to each other, and pixel electrodes connected to the switching elements are provided on one of the glass substrates. A counter electrode, a color filter formed of R, G, and B color sections, and the like, are provided on the other of the glass substrates.

Next, the backlight device 12 will be explained. The backlight device 12 is a so-called direct-light type backlight device that includes light sources (e.g., cold cathode tubes 17, in the present embodiment), which are positioned directly below the back surface of the liquid crystal panel 11 (i.e., the panel surface on the opposite side of the display side), and are arranged parallel to one another and along the panel surface.

The backlight device 12 includes a metallic base (or light reflecting plate) 14 having a substantially box-like shape with an opening on its upper side, and a plurality of optical members 15 (e.g., a diffuser plate, a diffusing sheet, a lens sheet and an optical sheet, in order from the lower side of the figure) which are arranged to cover in the opening of the base 14. Further included are a frame 16 arranged to hold the optical members 15 on the base 14, cold cathode tubes (or tubular light sources) 17 as lamps contained in the base 14, and lamp holders 19 arranged to collectively cover the cold cathode tubes 17. Note that the optical member 15 side of the cold cathode tubes 17 corresponds to the light emitting side of the backlight device 12.

The substantially box-like base 14 has a construction shown in FIG. 4, in which sheet metal 141 is attached to a plate-like base member 140 made of synthetic resin or metallic material. A reflective synthetic-resin coating film 142 is formed on the surface of the sheet metal 141, so that the sheet metal 141 and the reflective synthetic-resin coating film 142 together form a reflective metallic plate member. The base (or light reflecting plate) 14 thus includes a light reflecting surface 14a formed of the reflective synthetic-resin coating film 142, and thereby the light from the cold cathode tubes 17 can be reflected to the optical members 15 such as the diffuser plate (hereinafter, sometimes referred to as "the diffuser plate 15 and the like"). Alternatively, the base member 140 may be eliminated from the base 14, as shown in FIG. 5. That is, it can be constructed to have sheet metal 141 formed into the shape and a reflective synthetic-resin coating film 142 formed thereon.

Each of the cold cathode tubes 17 forms a tubular shape elongated in one direction. A number of cold cathode tubes 17 are arranged parallel to one another at even intervals (so as to form an array), and are contained in the base 14 so that the longitudinal direction (or axial direction) thereof conforms with the longitudinal direction of the base 14. Specifically, the cold cathode tubes 17 are arranged so that the array direction thereof is parallel to the planar surface of the base member 140 and also parallel to the planar surface (or light emitting surface) 15a of the optical member 15 such as the diffuser plate. Further, each cold cathode tube 17 is arranged parallel to the light reflecting surface 14a of the base 14 and also parallel to the planar surface 15a of the optical member 15. That is, the cold cathode tubes 17 are arranged parallel at even intervals in a plane area that is parallel to the planar surface of the base 14, or specifically, of the base member 140.

In the present embodiment, a plurality of angled reflective portions 40 are formed on the base 14, so as to be positioned in all of respective areas between adjacent cold cathode tubes 17 and 17. As shown in FIG. 2 and the like, each of the angled reflective portions 40 includes two inclined surfaces 41, 42. The inclined surfaces 41, 42 are arranged in lines in the areas between cold cathode tubes 17 and 17, so as to form a striped configuration formed of strips along the longitudinal direction of the cold cathode tubes 17. In the present embodiment, referring to FIG. 4, the base 14 having angled reflective portions 40 can be provided by forming the reflective synthetic-resin coating film 142 on the surface of the sheet metal 141 partly formed (or bent) into angled shapes and mounting the resultant structure on the base member 140. In the present embodiment, the constructions of the parallel-arranged angled reflective portions 40 differ depending on the arrangement positions, and the details thereof are as follows.

The inclination angles of the inclined surfaces 41 of the angled reflective portions 40 differ among angled reflective portions 40. Specifically, each angled reflective portion 40 includes the two inclined surfaces 41, 42, i.e., a first inclined surface 41 (41a, 41b and the like in FIG. 3) facing the inner side (i.e., the side of the center line (or central axis) "O" shown in FIG. 3) of the array of the parallel-arranged cold cathode tubes 17 and a second inclined surface 42 (42a, 42b and the like in FIG. 3) facing the outer side of the array. As for the first inclined surfaces 41 facing the inner side of the array, referring to FIG. 3, the inclination angle $\theta 1$ of the first inclined surface 41a of a first angled reflective portion (e.g., angled reflective portion 40a) located on the outer side of the array of the cold cathode tubes 17 is set to be larger than the inclination angle $\theta 2$ of the first inclined surface 41b of a second angled reflective portion 40b that is located on the inner side of the first angled reflective portion 40a and on the inner side of the array of the cold cathode tubes 17.

That is, referring to FIG. 3, the angled reflective portions 40a, 40b, 40c, 40d, 40e and 40f differ in shape, and specifically, "$\theta 1 > \theta 2 > \theta 3$" and "$\theta 6 > \theta 5 > \theta 4$" are true for inclination angles $\theta 1$, $\theta 2$, $\theta 3$, $\theta 4$, $\theta 5$ and $\theta 6$ of first inclined surfaces 41a, 41b, 41c, 41d, 41e and 41f. Note that the inclination angle $\theta$ (such as $\theta 1$ or $\theta 2$) means the angle of the first inclined surface 41 with respect to the fundamental plane of the angled reflective portion 40 (i.e., with respect to the surface of the base member 140 of the base 14), in the present embodiment.

Further, the angled reflective portions 40a, 40b, 40c, 40d, 40e and 40f are shaped to be symmetric with respect to the center line (or central axis) "O" of the array of the cold cathode tubes 17. Specifically, the inclination angles $\theta 1$, $\theta 2$, $\theta 3$, $\theta 4$, $\theta 5$ and $\theta 6$ of the first inclined surfaces 41a, 41b, 41c, 41d, 41e and 41f are formed to be symmetric with respect to the center line (or central axis) "O" of the array. That is, "$\theta 1 = \theta 6$", "$\theta 2 = \theta 5$" and "$\theta 3 = \theta 4$" are true. In the present embodiment, the inclination angles of the second inclined surfaces 42a, 42b, 42c, 42d, 42e and 42f are also formed to be symmetric with respect to the center line (or central axis) "O" of the array, but are not limited to this construction.

Moreover, the heights "h" of the angled reflective portions 40 above the base 14 (or specifically, above the base member 140) differ among angled reflective portions 40. Specifically, as shown in FIG. 3, the height "h1" of the first angled reflective portion 40a located on the outer side of the array of the cold cathode tubes 17 is set to be larger than the height "h2" of the second angled reflective portion 40b that is located on the inner side of the first angled reflective portion 40a and on the inner side of the array of the cold cathode tubes 17. That is, referring to FIG. 3, "h1>h2>h3" and "h6>h5>h4" are true for heights h1, h2, h3, h4, h5 and h6 of angled reflective portions 40a, 40b, 40c 40d, 40e and 40f. Note that height "h" (such as "h1" or "h2") means the height of the apex of an angled reflective portion 40 above the fundamental plane of the angled reflective portion 40 (i.e., above the surface of the base member (or sheet metal 141) of the base 14), in the present embodiment.

Specifically, the heights h1, h2, h3, h4, h5 and h6 of angled reflective portions 40a, 40b, 40c 40d, 40e and 40f are set to be symmetric with respect to the center line (or central axis) "O" of the array of the cold cathode tubes 17. That is, "h1=h6" "h2=h5" and "h3=h4" are true.

The liquid crystal display device 10 of the present embodiment has the above construction, and the operational effects thereof will be explained next. In the backlight device 12 of the liquid crystal display device 10 of the present embodiment, a plurality of cold cathode tubes 17 are arranged parallel at even intervals when viewed from the top (or when viewed from the display screen side). Angled reflective portions 40 are provided on the base 14, which are positioned in respective areas corresponding to areas between adjacent cold cathode tubes 17 and 17 so as to form a striped configuration. As for the first inclined surfaces 41 (41a, 41b and the like) of the angled reflective portions 40 (40a, 40b and the like), the inclination angle θ1 of the first inclined surface 41a of the first angled reflective portion 40a located on the relatively outer side of the array is set to be larger than the inclination angle θ2 of the first inclined surface 41b of the second angled reflective portion 40b located on the relatively inner side of the array.

According to the construction, referring to FIG. 3, the lights from the cold cathode tubes 17, or specifically, the lights emitted to the side of the light reflecting surface (or the base 14) on the opposite side of the light emitting side, can be reflected while being concentrated at the center side of the array (i.e., at the side of the center line "O" of the array). That is, the reflected lights can be further concentrated at the center, because the first inclined surfaces 41 of the angled reflective portions 40 are formed so that the inclination angle (e.g., θ1) thereof is larger at the outer-side angled reflective portion (e.g., at the angled reflective portion 40a). Accordingly, the liquid crystal display device 10 of the present embodiment that uses the above backlight device 12 can have enhanced central brightness of display.

Further in the liquid crystal display device 10 of the present embodiment, the first inclined surfaces 41 are arranged to form strips along the longitudinal direction of the cold cathode tubes 17. Thereby, the lights from the elongated cold cathode tubes 17 can be adequately reflected while being concentrated at the center side of the array (i.e., at the side of the center line "O"). Particularly, the angled reflective portions 40 (40a, 40b and the like) are arranged parallel so as to be positioned between the cold cathode tubes 17, and thereby the lights from the cold cathode tubes 17 can be reflected effectively and infallibly. Further, the angled reflective portions 40 are arranged at all of respective areas between the cold cathode tubes 17, and thereby every light from the cold cathode tubes 17 can be reflected effectively.

In the liquid crystal display device 10 of the present embodiment, the inclination angles θ (θ1, θ2 and the like) of the first inclined surfaces 41 (41a, 41b and the like) of the parallel-arranged angled reflective portions 40 (40a, 40b and the like) are formed to be symmetric with respect to the center line "O" of the array. That is, "θ1=θ6", "θ2=θ5" and "θ3=θ4" are true. According to the construction, the lights from the cold cathode tubes 17 on the both end sides of the array located across the center from each other can be adequately concentrated at the center side of the array.

Further in the liquid crystal display device 10 of the present embodiment, the cold cathode tubes 17 are arranged at even intervals. According to the construction, in general, the amounts of lights to be emitted are distributed substantially uniformly over the light emitting surface. However, according to the present embodiment, the angled reflective portions 40 are arranged between the cold cathode tubes 17 of the array, individually at different inclination angles θ. Thereby, the central brightness can be adequately enhanced, although the cold cathode tubes 17 are arranged at even intervals.

Moreover, in the liquid crystal display device 10 of the present embodiment, as for the heights "h" of the angled reflective portions 40 above the fundamental plane of the base 14 (or, above the fundamental plane of the sheet metal 141), the height h1 of the first angled reflective portion 40a on the outer side of the array is set to be larger than the height h2 of the second angled reflective portion 40b. This construction facilitates the design of varying inclination angle θ. Further, due to the smaller height of the inner-side second angled reflective portion (e.g., angled reflective portion 40b), the light reflected by the outer-side first angled reflective portion (e.g., angled reflective portion 40a) can be prevented from being reflected by the inner-side second angled reflective portion (or angled reflective portion 40b). Consequently, the reflected lights can be adequately concentrated at the center side.

In the liquid crystal display device 10 of the present embodiment, the cold cathode tubes 17 are arranged in a plane area parallel to the planar surface (or fundamental plane) of the base 14. The above effect (i.e., the light-concentrating effect) of the angled reflecting portions 40 having the first inclined surfaces 41 arranged at different inclination angles θ is particularly prominent when the cold cathode tubes 17 are arranged in a plane area parallel to the planar surface (or fundamental plane) of the base 14 as in the present embodiment. That is, the concentration of light at the center due to the angled reflective portions 40 having the above construction may be slightly reduced when the cold cathode tubes 17 are arranged in a plane area that is not parallel to the planar surface (or fundamental plane) of the base 14. In contrast, the degree of light concentration at the center can be increased when the cold cathode tubes 17 are arranged in one plane area parallel to the planar surface (or fundamental plane) of the base 14.

The base 14 is formed of a base member 140 and sheet metal 141 provided thereon, and the angled reflective portions 40 are formed by bending the sheet metal 141. Further, as described above, a reflective synthetic-resin coating film 142 as a light reflective coating film is formed on the surface of the sheet metal 141 so as to form a light reflecting surface. According to the construction, the angled reflective portions 40 can be readily and infallibly formed on the base 14. In the case of the construction thus including the reflective synthetic-resin coating film 142 formed on the sheet metal (or metallic plate member) 141, workability and light reflectivity can be independently and suitably designed, which enables provision of a backlight device 12 that meets a number of requirements.

Shown above is the embodiment of the present invention. However, the present invention is not limited to the embodiment explained in the above description made with reference to the drawings. The following embodiments may be included in the technical scope of the present invention, for example, and further the present invention may be embodied in various forms without departing from the scope of the invention.

In the above embodiment, cold cathode tubes 17 are used as tubular light sources. However, the present invention can include a construction in which another type of tubular light sources such as hot cathode tubes are used, for example. Further, holding members (or lamp clips) may be provided on the base 14 so as to restrict the arrangement positions of the cold cathode tubes 17.

The present invention can be applied to a liquid crystal display device that uses another type of switching elements than TFTs. Further, the present invention can be applied to a liquid crystal display device for monochrome display, as well as a liquid crystal display device capable of color display. Moreover, although a liquid crystal display device is shown in the above embodiment, the present invention can be applied to other types of display devices than a liquid crystal type, which use a backlight device.

The invention claimed is:

1. A lighting device for a display device, comprising:
a plurality of linear light sources arranged parallel to one another so as to emit light to a light emitting side; and a light reflecting plate arranged on a back side of said plurality of linear light sources that corresponds to an opposite side of said light emitting side, wherein:
a first angled reflective portion having an angled section is provided on said light reflecting plate, so as to be positioned between adjacently-arranged linear light sources of said plurality of linear light sources;
said first angled reflective portion includes a first inclined surface and a second inclined surface as light reflecting surfaces, so that said first inclined surface faces a center side of an array of said plurality of linear light sources while said second inclined surface faces an outer side of the array of said plurality of linear light sources;
a second angled reflective portion having an angled section is provided on said light reflecting plate, so as to be positioned between adjacently-arranged linear light sources of said plurality of linear light sources and closer to a center of the array of said plurality of light sources than said first angled reflective portion;
said second angled reflective portion includes a third inclined surface and a fourth inclined surface as light reflecting surfaces, so that said third inclined surface faces the center side of an array of said plurality of linear light sources while said fourth inclined surface faces an outer side of the array of said plurality of linear light sources; and an inclination angle of said first inclined surface is set to be larger than an inclination angle of the third inclined surface.

2. A lighting device for a display device, as in claim 1, wherein said first inclined surface, said second inclined surface, said third inclined surface and said fourth inclined surface are arranged to form strips along a longitudinal direction of said plurality of linear light sources.

3. A lighting device for a display device, as in claim 1, wherein:
a plurality of angled reflective portions including said first angled reflective portion and said second angled reflective portion are provided on said light reflecting plate, so as to be each positioned between adjacently-arranged linear light sources of said plurality of linear light sources and be arranged parallel to one another; and
each of said plurality of angled reflective portions includes an inclined surface that faces the center side of the array of said plurality of linear light sources.

4. A lighting device for a display device, as in claim 3, wherein inclination angles of said inclined surfaces of said plurality of angled reflective portions are formed to be symmetric with respect to a center of an array of said plurality of angled reflective portions.

5. A lighting device for a display device, as in claim 3, wherein said plurality of angled reflective portions are arranged at all of respective areas between adjacently-arranged linear light sources of said plurality of linear light sources.

6. A lighting device for a display device, as in claim 1, wherein said plurality of linear light sources are arranged at even intervals.

7. A lighting device for a display device, as in claim 1, wherein a height of said first angled reflective portion above said light reflecting plate is set to be larger than a height of said second angled reflective portion.

8. A lighting device for a display device, as in claim 1, wherein said plurality of linear light sources are arranged in a plane area parallel to a planar surface of said light reflecting plate.

9. A lighting device for a display device, as in claim 1, wherein:
said light reflecting plate includes a reflective metallic plate member provided on a base member made of synthetic resin; and
said first angled reflective portion and said second angled reflective portion are formed by bending said reflective metallic plate member.

10. A lighting device for a display device, as in claim 9, wherein said reflective metallic plate member has a construction in which a reflective coating film is formed on a metallic plate member.

11. A display device comprising:
a lighting device for a display device, as in claim 1; and
a display panel for providing display by use of light from said lighting device for a display device.

12. A display device as in claim 11, wherein said display panel is a liquid crystal panel that uses liquid crystal.

* * * * *